United States Patent
Barnes et al.

(10) Patent No.: US 9,694,560 B2
(45) Date of Patent: Jul. 4, 2017

(54) MULTI-LAYER FILM ADHESIVE

(75) Inventors: Stephen Barnes, Rainier, WA (US); Thomas Lowe, Kent, WA (US)

(73) Assignee: The Boeing Company, Chicago, IL (US)

( * ) Notice: Subject to any disclaimer, the term of this patent is extended or adjusted under 35 U.S.C. 154(b) by 1165 days.

(21) Appl. No.: 12/143,939

(22) Filed: Jun. 23, 2008

(65) Prior Publication Data

US 2009/0317610 A1 Dec. 24, 2009

(51) Int. Cl.
| | | |
|---|---|---|
| *B32B 7/02* | (2006.01) | |
| *B32B 7/12* | (2006.01) | |
| *B32B 15/08* | (2006.01) | |
| *B32B 15/092* | (2006.01) | |
| *B32B 27/08* | (2006.01) | |
| *B32B 27/38* | (2006.01) | |
| *B32B 27/40* | (2006.01) | |
| *B64C 1/00* | (2006.01) | |
| *B64C 3/00* | (2006.01) | |
| *B64C 5/00* | (2006.01) | |
| *B32B 15/095* | (2006.01) | |
| *B32B 27/28* | (2006.01) | |
| *B32B 27/30* | (2006.01) | |

(52) U.S. Cl.
CPC ............... *B32B 7/12* (2013.01); *B32B 7/02* (2013.01); *B32B 15/08* (2013.01); *B32B 15/092* (2013.01); *B32B 15/095* (2013.01); *B32B 27/08* (2013.01); *B32B 27/281* (2013.01); *B32B 27/308* (2013.01); *B32B 27/38* (2013.01); *B32B 27/40* (2013.01); *B32B 2270/00* (2013.01); *B32B 2307/538* (2013.01); *B32B 2405/00* (2013.01); *B32B 2605/00* (2013.01); *B32B 2605/08* (2013.01); *B32B 2605/18* (2013.01); *B64C 1/00* (2013.01); *B64C 3/00* (2013.01); *B64C 5/00* (2013.01); *C09J 2201/36* (2013.01); *Y10T 428/24942* (2015.01)

(58) Field of Classification Search
USPC ....................................... 428/41.9
See application file for complete search history.

(56) References Cited

U.S. PATENT DOCUMENTS

| | | | |
|---|---|---|---|
| 4,273,827 A * | 6/1981 | Sweeney et al. | 428/316.6 |
| 6,361,146 B1 * | 3/2002 | Saldanha Singh et al. | 347/50 |
| 7,070,051 B2 * | 7/2006 | Kanner et al. | 206/382 |

(Continued)

FOREIGN PATENT DOCUMENTS

| | | |
|---|---|---|
| JP | 2003249791 A * | 9/2003 |
| WO | WO 0157151 A2 * | 8/2001 |

OTHER PUBLICATIONS

Human translation of JP 2003-249791 A (2003).*

(Continued)

*Primary Examiner* — Frank D Ducheneaux (57) ABSTRACT

There is provided a multi-layer adhesive for reducing squeeze out. The multi-layer adhesive comprises a first adhesive layer having a first adhesive property and a second adhesive layer having a second adhesive property. The second adhesive property is different from the first adhesive property. The first adhesive layer and the second adhesive layer form a film adhesive. In another embodiment, there is provided a structure comprising a first component and a second component bonded with the multi-layer adhesive.

21 Claims, 4 Drawing Sheets

(56) References Cited

U.S. PATENT DOCUMENTS

2003/0211291 A1* 11/2003 Castiglione et al. ......... 428/172
2005/0227031 A1* 10/2005 Yang et al. .................. 428/40.1
2007/0138296 A1* 6/2007 Bargmann et al. ........... 235/492

OTHER PUBLICATIONS

Report from Bloomingdale Rubber Company (now CYTEC), Aberdeen, Maryland, Aberdeen 2050, "FM-61 Adhesive Film," Revised Jan. 13, 1960, pp. 1-5.

\* cited by examiner

MULTI-LAYER FILM ADHESIVE

BACKGROUND OF THE DISCLOSURE

1) Field of the Disclosure

The disclosure relates to film adhesives. More particularly, the disclosure relates to a multi-layer film adhesive with at least one layer having a chemical or adhesive property that is different than a chemical or adhesive property of another layer.

2) Description of Related Art

Multi-ply film adhesives are often used to join or bond two materials together, such as composite and/or metal components of aircraft, rotorcraft, vehicles such as automobiles and trucks, items of equipment, architectural structures, and various other structures having component parts to be adhesively bonded. Such adhesives may be used to bond two composite materials together, two metal materials together, a composite material to a metal material, a pre-cured material to an un-cured material, or a pre-cured material to a pre-cured material. Known adhesives, such as nitrile phenolics and epoxies, may be used to bond metal materials to metal materials, such as metal honeycomb structures. However, such nitrile phenolics have proven not to be optimal at bonding two composite materials together, a composite material to a metal material, a pre-cured material to an un-cured material, or a pre-cured material to a pre-cured material.

Known film adhesives typically consist of a single homogeneous layer that is optimized for a single adhesive or chemical property, such as gap filling, wetability, flow rate, bond strength, material compatibility, temperature versus viscosity, ease of application, or another adhesive or chemical property. For example, a difficulty with bonding composite or metal parts together is that gaps may form and vary from place to place on a single structure such as an aircraft, and thus the use of adhesives with good gap filling properties can prevent or minimize such gaps. However, the use of such known single layer adhesives with good gap filling properties may require an excessive amount of such adhesive to be applied to the parts, thus resulting in wasted adhesive that must be cleaned up and removed. This can be labor intensive and time consuming, resulting in increased manufacturing costs. In addition, a difficulty with bonding composite or metal parts to a substrate is that although a known single layer adhesive may wet or flow well over the surface of the substrate so that the composite or metal effectively adheres to the substrate, such adhesive may not have sufficient strength to maintain joint integrity. Similarly, a known single layer adhesive may exhibit good specific strength properties but may not have good wetability or flow to adequately wet the surface of the substrate to maintain joint integrity. Moreover, known single layer adhesives can produce excess adhesive squeeze out when composite or metal parts are bonded together using such adhesives. Where such excess adhesive squeeze out can be seen and accessed, removal of such excess adhesive squeeze out requires additional labor and time to remove. This can increase manufacturing costs. Where such excess adhesive squeeze out cannot be seen or accessed, such as in a closed assembly, removal of such excess adhesive squeeze out may not be possible and thus, such excess adhesive squeeze out remains on the part and adds extra weight to the part, such as an aircraft component part. Such extra weight on an aircraft component part may increase the weight of an aircraft and decrease the aircraft's performance.

Accordingly, there is a need for a multi-layer film adhesive that has advantages over known film adhesives.

SUMMARY OF THE DISCLOSURE

This need for a multi-layer film adhesive that has advantages over known film adhesives, as well as a unique, nonobvious, and advantageous adhesive, is satisfied. None of the known film adhesives provides all of the numerous advantages discussed herein. Unlike known film adhesives, embodiments of the multi-layer film adhesive have one or more of the following advantages: provides a multi-layer film adhesive with improved adhesive bonding of component parts through limiting excess squeeze out of the adhesive while providing improved wetability, flow rate, gap filling, material compatibility, temperature versus viscosity, ease of application, and/or bond strength; provides a multi-layer film adhesive that can be used to effectively bond two composite materials together, two metal materials together, a composite material to a metal material, a pre-cured material to an un-cured material, and a pre-cured material to a pre-cured material; provides a multi-layer film adhesive that allows for bonding of hybrid (uses adhesives and fasteners) component part assemblies and closed component part assemblies where cleaning of adhesive squeeze out may not be possible; provides a multi-layer film adhesive where at least one layer has an adhesive or chemical property that is different than an adhesive or chemical property of another layer, which results in an optimized adhesive; provides a multi-layer film adhesive with improved adhesive performance while requiring no additional labor to install the adhesive; provides a multi-layer film adhesive that reduces manufacturing costs by reducing clean up costs and reduces aircraft weight which results in better aircraft performance; provides a multi-layer film adhesive that may yield higher allowable strength characteristics resulting in a more efficient engineering design of the structural parts; provides a multi-layer film adhesive that combines chemically compatible films for improved bonding effectiveness and structural performance, and in particular, improved bonding effectiveness and structural performance of composite parts; and provides a multi-layer film adhesive that may be applied to aircraft, rotorcraft, vehicles such as automobiles and trucks, items of equipment, architectural structures, and various other structures having component parts to be adhesively bonded together.

In an embodiment of the disclosure, there is provided a multi-layer adhesive for reducing squeeze out comprising: a first adhesive layer having a first adhesive property; and, a second adhesive layer having a second adhesive property, wherein the second adhesive property is different from the first adhesive property, and further wherein the first adhesive layer and the second adhesive layer form a film adhesive.

In another embodiment of the disclosure, there is provided a multi-layer adhesive for reducing squeeze out comprising: a first adhesive layer having a first chemical property; a second adhesive layer having a second chemical property, wherein the second chemical property is different from the first chemical property; a third adhesive layer having a third chemical property, wherein the third chemical property is different than the first and second chemical properties, and further wherein the first adhesive layer, the second adhesive layer, and the third adhesive layer form a film adhesive.

In another embodiment of the disclosure, there is provided a structure comprising a first component and a second component bonded with a multi-layer adhesive, wherein the multi-layer adhesive comprises a first adhesive layer having a first adhesive property, and a second adhesive layer having a second adhesive property, wherein the second adhesive property is different from the first adhesive property, and further wherein the first adhesive layer and the second adhesive layer form a film adhesive.

In another embodiment of the disclosure, there is provided a multi-layer adhesive for reducing squeeze out comprising: a first adhesive layer having a first adhesive property, wherein the first adhesive layer is bonded to a composite substrate; and, a second adhesive layer having a second adhesive property, wherein the second adhesive property is different from the first adhesive property and the second adhesive layer is bonded to a metal substrate, and further wherein the first adhesive layer and the second adhesive layer form a film adhesive.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings wherein.

DETAILED DESCRIPTION OF THE DISCLOSURE

Embodiments of the disclosure will now be described more fully hereinafter with reference to the accompanying drawings. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The multi-layer film adhesive of the disclosure may be used to bond or join component parts of aircraft, rotorcraft, vehicles such as automobiles and trucks, items of equipment, architectural structures, and various other structures having component parts to be adhesively bonded together. Accordingly, one of ordinary skill in the art will recognize and appreciate that the multi-layer film adhesive can be used in any number of applications involving component parts to be adhesively bonded together.

Figure 1:
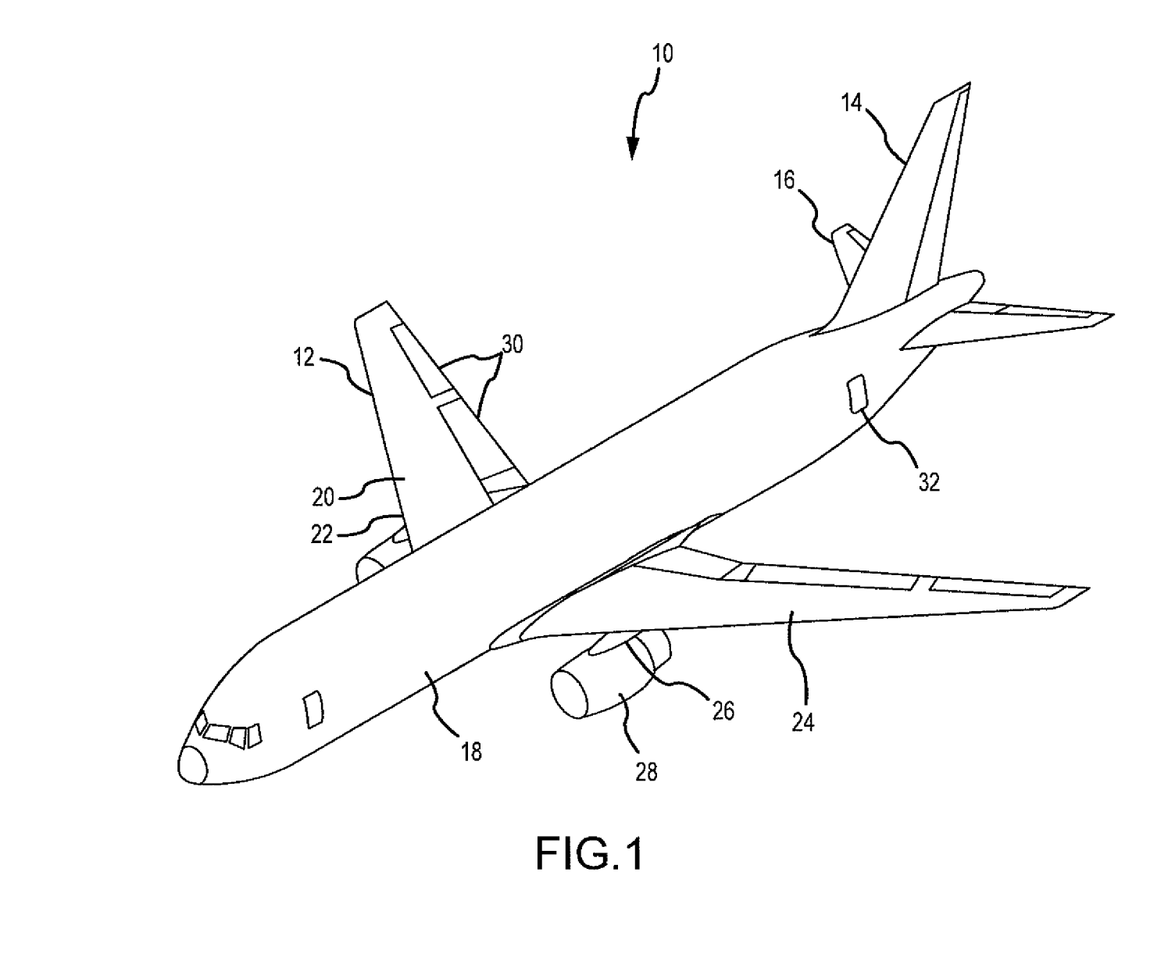
FIG. 1 is a perspective view of an aircraft showing various areas where the multi-layer film adhesive of the disclosed embodiments may be applied.

Referring now to the Figures, FIG. 1 is a perspective view of an aircraft 10 showing various areas where the multi-layer film adhesive of the disclosed embodiments may be applied. Such areas and/or joints that may be bonded with the multi-layer film adhesive of the disclosed embodiments may include, but are not limited to, a wing skin 12 to a spar chord (not shown), a vertical stabilizer skin 14 to a stiffener (not shown), a horizontal stabilizer skin 16 to a stiffener (not shown), a fuselage skin 18 to shear tied frames (not shown), a leading edge slat 20, a fixed leading edge 22, fixed trailing edge panels 24, strut doors 26, engine cowls 28, trailing edge of control surfaces 30, and door surround doublers 32.

Figure 2:
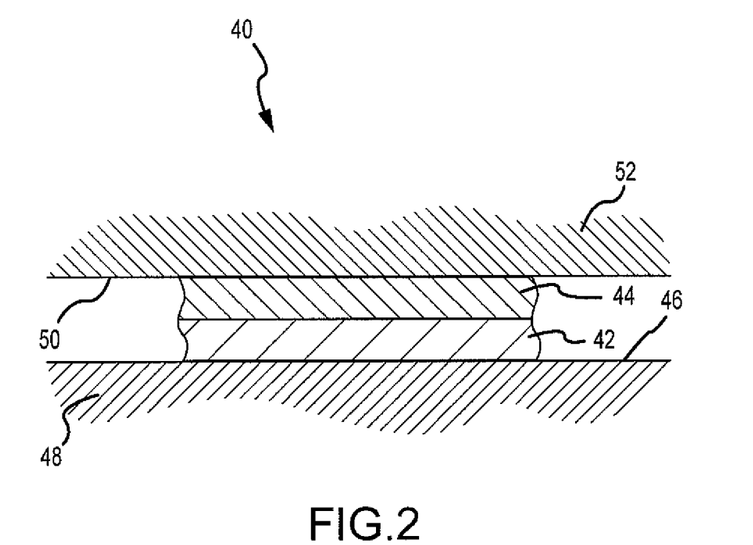
FIG. 2 is a side view of a first disclosed embodiment of the multi-layer film adhesive of the disclosure.

In an embodiment of the disclosure, there is provided a multi-layer adhesive for reducing squeeze out. FIG. 2 is a side view of a first disclosed embodiment 40 of the multi-layer film adhesive of the disclosure. As shown in FIG. 2, the multi-layer adhesive comprises a first adhesive layer 42 having a first adhesive or chemical property. The first adhesive or chemical property may comprise flow rate, wetability, strength, gap filling, material compatibility, temperature versus viscosity, ease of application, or another suitable adhesive or chemical property. The multi-layer adhesive further comprises a second adhesive layer 44 having a second adhesive or chemical property. The second adhesive layer 44 is adjacent the first adhesive layer 42. The second adhesive or chemical property may comprise flow rate, wetability, strength, gap filling, material compatibility, temperature versus viscosity, ease of application, or another suitable adhesive or chemical property. In this embodiment, the second adhesive or chemical property is different from the first adhesive or chemical property. The first adhesive layer and the second adhesive layer form a film adhesive. The bottom of the first adhesive layer 42 of the multi-layer film adhesive may be directly applied to or put in contact with a first surface 46 of a first substrate 48. A second surface 50 of a second substrate 52 may be in contact with the top of the second adhesive layer 44. The multi-layer film adhesive may be preferably positioned between the first substrate 48 and the second substrate 52 in order to bond the first substrate 48 to the second substrate 52. The substrate may comprise a composite material, a metal material, or another suitable substrate material. The first substrate and the second substrate may be made of the same material or may be made of different materials. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The first adhesive layer preferably has a typical thickness of at least about 0.0015 inch. The second adhesive layer preferably has a typical thickness of at least about 0.0015 inch. The multi-layer adhesive may further comprise one or more additional adhesive layers. Optionally, the multi-layer adhesive may further comprise one or more tie coat layers to tie together two chemically incompatible adhesive layers or to tie together a substrate and an adhesive layer where the adhesive layer is chemically incompatible with the substrate.

Figure 3:
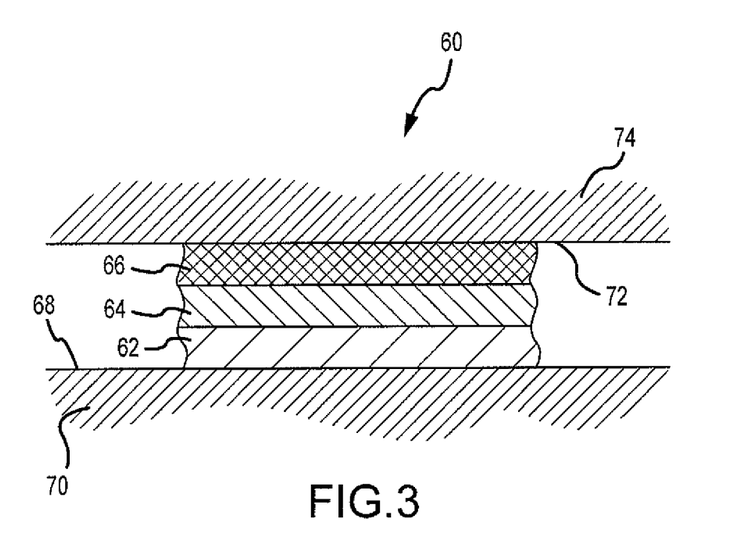
FIG. 3 is a side view of a second disclosed embodiment of the multi-layer film adhesive of the disclosure.

In another embodiment of the disclosure, there is provided a multi-layer adhesive for reducing squeeze out having three layers. FIG. 3 is a side view of a second disclosed embodiment 60 of the multi-layer film adhesive of the disclosure. The multi-layer adhesive comprises a first adhesive layer 62 having a first adhesive or chemical property. The multi-layer adhesive further comprises a second adhesive layer 64 having a second adhesive or chemical property. The second adhesive layer 64 is adjacent the first adhesive layer 62. In this embodiment, the second adhesive or chemical property is different from the first adhesive or chemical property. The multi-layer adhesive further comprises a third adhesive layer 66 having a third adhesive or chemical property. The third adhesive layer 66 is adjacent the second adhesive layer 64. In this embodiment, the third adhesive or chemical property is different from the first and second adhesive or chemical properties. Alternatively, the third adhesive or chemical property may be the same as the first adhesive or chemical property (see FIG. 6 and below disclosure). The first adhesive layer, the second adhesive layer, and the third adhesive layer form a film adhesive. The first, second, and third adhesive or chemical properties may comprise flow rate, wetability, strength, gap filling, material compatibility, temperature versus viscosity, ease of application, or another suitable adhesive or chemical property. The bottom of the first adhesive layer 62 of the multi-layer film adhesive may be directly applied to or put in contact with a first surface 68 of a first substrate 70. A second surface 72 of a second substrate 74 may be in contact with the top of the third adhesive layer 66. The multi-layer film adhesive may be preferably positioned between the first substrate 70 and the second substrate 74 in order to bond the first substrate 70 to the second substrate 74. The substrate may comprise a composite material, a metal material, or another suitable substrate material. The first substrate and the second substrate may be made of the same material or may be made of different materials. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The first adhesive layer preferably has a typical thickness of at least about 0.0015 inch. The second adhesive layer preferably has a typical thickness of at least about 0.0015 inch. The third adhesive layer preferably has a typical thickness of at least about 0.0015 inch. The multi-layer adhesive may further comprise one or more additional adhesive layers. Optionally, the multi-layer adhesive may further comprise one or more tie coat layers to tie together two chemically incompatible adhesive layers or to tie together a substrate and an adhesive layer where the adhesive layer is chemically incompatible with the substrate.

Figure 4:
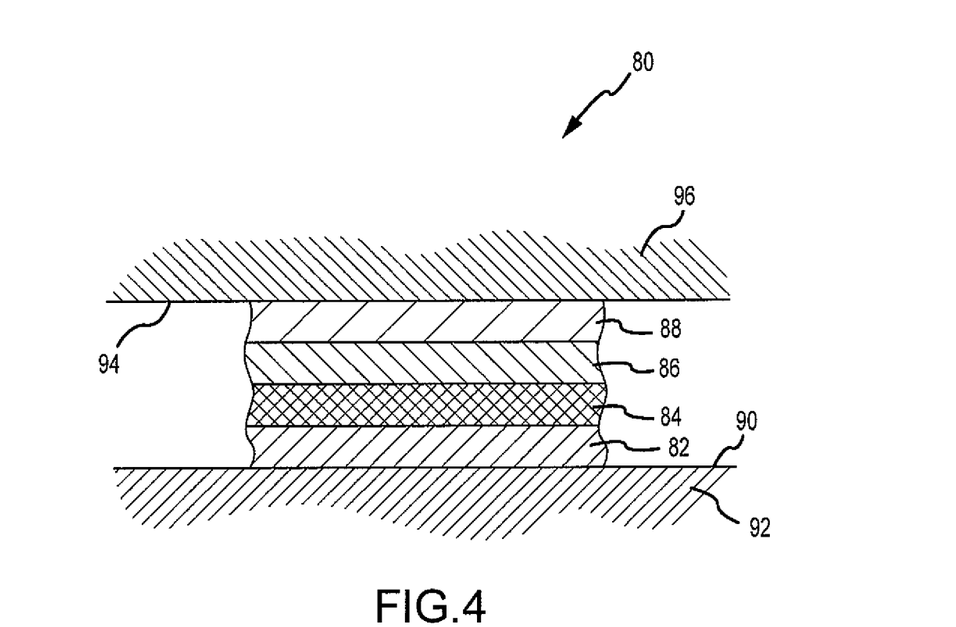
FIG. 4 is a side view of a third disclosed embodiment of the multi-layer film adhesive of the disclosure.

In another embodiment of the disclosure, there is provided a multi-layer adhesive for reducing squeeze out wherein the multi-layer adhesive has four layers. FIG. 4 is a side view of a third disclosed embodiment 80 of the multi-layer film adhesive of the disclosure. The multi-layer adhesive comprises a first adhesive layer 82 having a first adhesive or chemical property. The multi-layer adhesive further comprises a second adhesive layer 84 having a second adhesive or chemical property. The second adhesive layer 84 is adjacent the first adhesive layer 82. In this embodiment, the second adhesive or chemical property is different from the first adhesive or chemical property. The multi-layer adhesive further comprises a third adhesive layer 86 having a third adhesive or chemical property. The third adhesive layer 86 is adjacent the second adhesive layer 84. In this embodiment, the third adhesive or chemical property is different than the first and second adhesive or chemical properties. The multi-layer adhesive further comprises a fourth adhesive layer 88 having a fourth adhesive or chemical property. The fourth adhesive layer 88 is adjacent the third adhesive layer 86. The fourth adhesive or chemical property may be different from the first, second, and third adhesive or chemical properties. Alternatively, the fourth adhesive or chemical property may be the same as either the first, second, or third adhesive or chemical properties. Adjacent layers may have the same chemical properties and may or may not be separated. Alternatively, adjacent layers may have different chemical properties. The first adhesive layer, the second adhesive layer, the third adhesive layer, and the fourth adhesive layer form a film adhesive. The first, second, third, and fourth adhesive or chemical properties may comprise flow rate, wetability, strength, gap filling, material compatibility, temperature versus viscosity, ease of application, or another suitable adhesive or chemical property. The bottom of the first adhesive layer 82 of the multi-layer film adhesive may be directly applied to or put in contact with a first surface 90 of a first substrate 92. A second surface 94 of a second substrate 96 may be in contact with the top of the fourth adhesive layer 88. The multi-layer film adhesive may be preferably positioned between the first substrate 92 and the second substrate 96 in order to bond the first substrate 92 to the second substrate 96. The substrate may comprise a composite material, a metal material, or another suitable substrate material. The first substrate and the second substrate may be made of the same material or may be made of different materials. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The first adhesive layer preferably has a typical thickness of at least about 0.0015 inch. The second adhesive layer preferably has a typical thickness of at least about 0.0015 inch. The third adhesive layer preferably has a typical thickness of at least about 0.0015 inch. The fourth adhesive layer preferably has a typical thickness of at least about 0.0015 inch. The multi-layer adhesive may further comprise one or more additional adhesive layers. Optionally, the multi-layer adhesive may further comprise one or more tie coat layers to tie together two chemically incompatible adhesive layers or to tie together a substrate and an adhesive layer where the adhesive layer is chemically incompatible with the substrate.

Figure 5:
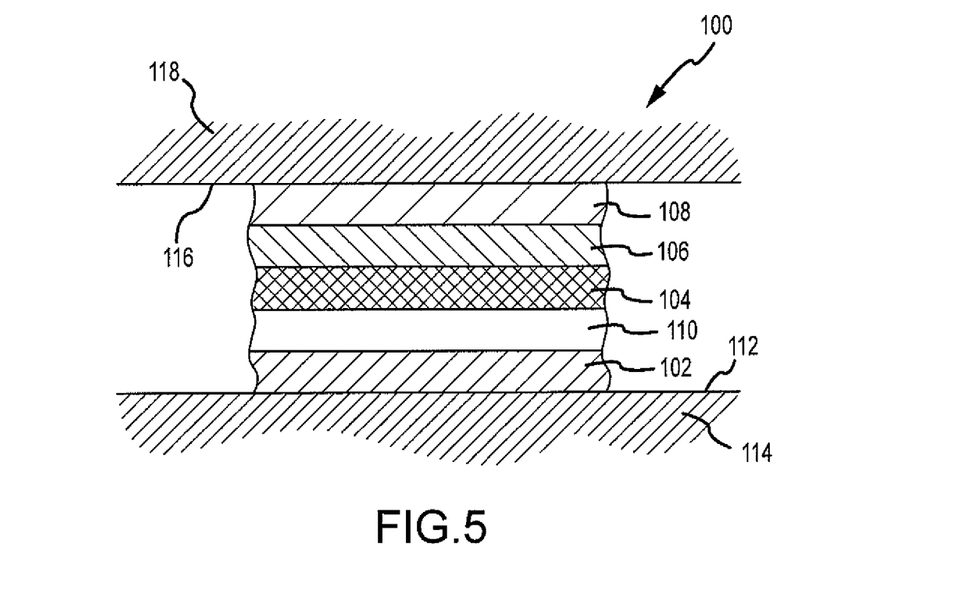
FIG. 5 is a side view of a fourth disclosed embodiment of the multi-layer film adhesive of the disclosure; and, FIG. 6 is a side view of a fifth disclosed embodiment of the multi-layer film adhesive of the disclosure.

In another embodiment of the disclosure, there is provided a multi-layer adhesive for reducing squeeze out wherein the multi-layer adhesive has four layers and a tie coat layer. FIG. 5 is a side view of a fourth disclosed embodiment 100 of the multi-layer film adhesive of the disclosure. The multi-layer adhesive comprises a first adhesive layer 102 having a first adhesive or chemical property. The multi-layer adhesive further comprises a second adhesive layer 104 having a second adhesive or chemical property. The second adhesive layer 104 is adjacent the first adhesive layer 102. In this embodiment, the second adhesive or chemical property is different from the first adhesive or chemical property. The multi-layer adhesive further comprises a third adhesive layer 106 having a third adhesive or chemical property. The third adhesive layer 106 is adjacent the second adhesive layer 104. In this embodiment, the third adhesive or chemical property is different than the first and second adhesive or chemical properties. The multi-layer adhesive farther comprises a fourth adhesive layer 108 having a fourth adhesive or chemical property. The fourth adhesive layer 108 is adjacent the third adhesive layer 106. The fourth adhesive or chemical property may be different from the first, second, and third adhesive or chemical properties. Alternatively, the fourth adhesive or chemical property may be the same as either the first, second, or third adhesive or chemical properties. The multi-layer adhesive further comprises a tie coat layer 110, such as a primer layer. FIG. 5 shows the tie coat layer 110 between and adjacent to both the first layer 102 and the second layer 104. However, more than one tie coat layer may be used to tie together two chemically incompatible adhesive layers or to tie together a substrate and an adhesive layer where the adhesive layer is chemically incompatible with the substrate. In an embodiment, a tie coat layer or primer layer may be added between two or more layers of adhesive. The intermediate tie coat layer may be used between the adhesive layers to improve interlayer bonding of the adhesive layers or the intermediate tie coat layer may be used between the substrate and a first adhesive layer to improve the bonding of the adhesive layer to the substrate. For example, where a layer of adhesive is not compatible with an adjacent layer of adhesive, it is possible to add the tie coat or primer layer in between the two adhesive layers to make the adhesive layers compatible. Alternatively, for example, where a substrate, such as a metallic substrate of aluminum or titanium, is not compatible with a first layer or outer layer of adhesive, it is possible to add the tie coat layer or primer layer in between the substrate and the first adhesive layer to make the first adhesive layer compatible with the substrate. The tie coat layer or primer layer acts as an intermediate coat that is chemically friendly and chemically ties together the two layers or layer and substrate it is between. The tie coat layer or primer layer preferably has adhesive and/or chemical properties. The first adhesive layer, the second adhesive layer, the third adhesive layer, the fourth adhesive layer, and the tie coat layer form a film adhesive. The first, second, third, and fourth adhesive or chemical properties may comprise flow rate, wetability, strength, gap filling, material compatibility, temperature versus viscosity, ease of application, or another suitable adhesive or chemical property. The bottom of the first adhesive layer 102 of the multi-layer film adhesive may be directly applied to or put in contact with a first surface 112 of a first substrate 114. A second surface 116 of a second substrate 118 may be in contact with the top of the fourth adhesive layer 108. The multi-layer film adhesive may be preferably positioned between the first substrate 114 and the second substrate 118 in order to bond the first substrate 114 to the second substrate 118. The substrate may comprise a composite material, a metal material, or another suitable substrate material. The first substrate and the second substrate may be made of the same material or may be made of different materials. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The first adhesive layer preferably has a typical thickness of at least about 0.0015 inch. The second adhesive layer preferably has a typical thickness of at least about 0.0015 inch. The third adhesive layer preferably has a typical thickness of at least about 0.0015 inch. The fourth adhesive layer preferably has a typical thickness of at least about 0.0015 inch. The tie coat layer preferably has a typical thickness of at least about 0.000005 inch. The multi-layer adhesive may further comprise one or more additional adhesive layers and/or one or more additional tie coat layers.

Figure 6:
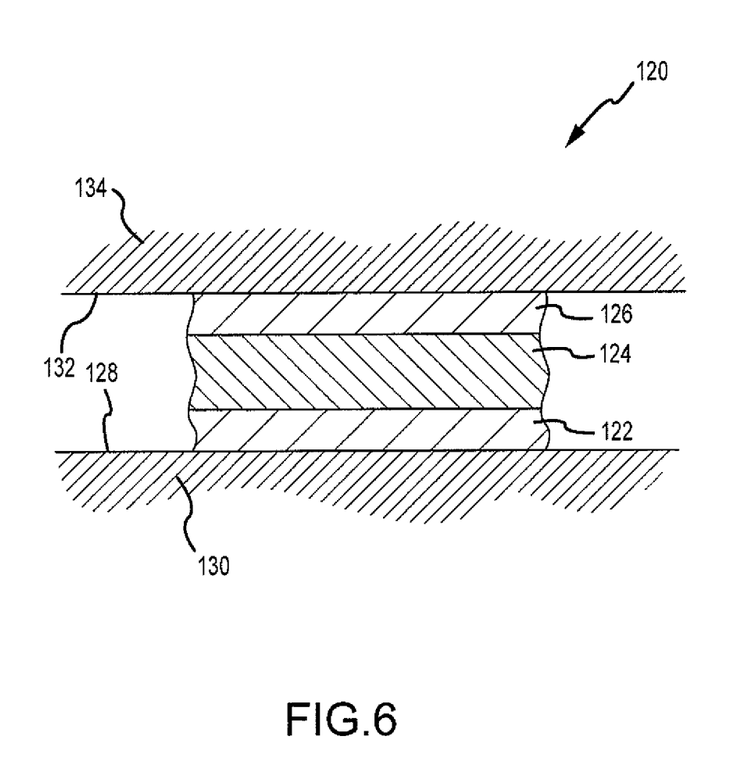

In another embodiment of the disclosure, there is provided a multi-layer adhesive for reducing squeeze out having three layers, where a first layer and a third layer have the same adhesive or chemical properties and a second layer has an adhesive or chemical property different from the adhesive or chemical property of the first and third layers. FIG. 6 is a side view of a fifth disclosed embodiment 120 of the multi-layer film adhesive of the disclosure. The multi-layer adhesive comprises a first adhesive layer 122 having a first adhesive or chemical property. The multi-layer adhesive further comprises a second adhesive layer 124 having a second adhesive or chemical property. The second adhesive layer 124 is adjacent the first adhesive layer 122. In this embodiment, the second adhesive or chemical property is different from the first adhesive or chemical property. The multi-layer adhesive further comprises a third adhesive layer 126 having a third adhesive or chemical property. The third adhesive layer 126 is adjacent the second adhesive layer 124. In this embodiment, the third adhesive or chemical property is the same as the first adhesive or chemical property, and the third adhesive or chemical property is different from the second adhesive or chemical property. The first adhesive layer, the second adhesive layer, and the third adhesive layer form a film adhesive. The first, second, and third adhesive or chemical properties may comprise flow rate, wetability, strength, gap filling, material compatibility, temperature versus viscosity, ease of application, or another suitable adhesive or chemical property. In this embodiment, preferably the first layer and the third layer are optimized for wetability and preferably the second layer is optimized for strength or toughness. The bottom of the first adhesive layer 122 of the multi-layer film adhesive may be directly applied to or put in contact with a first surface 128 of a first substrate 130. A second surface 132 of a second substrate 134 may be in contact with the top of the third adhesive layer 126. The multi-layer film adhesive may be preferably positioned between the first substrate 130 and the second substrate 134 in order to bond the first substrate 130 to the second substrate 134. The substrate may comprise a composite material, a metal material, or another suitable substrate material. The first substrate and the second substrate may be made of the same material or may be made of different materials. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The first adhesive layer preferably has a typical thickness of at least about 0.0015 inch. The second adhesive layer preferably has a typical thickness of at least about 0.0015 inch. The third adhesive layer preferably has a typical thickness of at least about 0.0015 inch. The multi-layer adhesive may further comprise one or more additional adhesive layers. Optionally, the multi-layer adhesive may further comprise one or more tie coat layers to tie together two chemically incompatible adhesive layers or to tie together a substrate and an adhesive layer where the adhesive layer is chemically incompatible with the substrate.

In another embodiment, a structure is provided comprising a first component and a second component bonded with a multi-layer adhesive. The multi-layer adhesive may comprise any of the disclosed embodiments discussed above. Preferably, the multi-layer adhesive comprises a first adhesive layer having a first adhesive or chemical property, and a second adhesive layer having a second adhesive or chemical property. In this embodiment, the second adhesive or chemical property is different from the first adhesive property. The first adhesive layer and the second adhesive layer form a film adhesive. The first adhesive or chemical property and the second adhesive or chemical property may comprise flow rate, wetability, strength, gap filling, material compatibility, temperature versus viscosity, ease of application, or another suitable adhesive or chemical property. The first component and the second component may comprise a composite, a metal, a pre-cured material, and an un-cured material. The multi-layer film adhesive may comprise an epoxy, a bismalimide, crosslinkable polymeric materials such as methacrylate, polyimide, acrylic, polyurethane, epoxide polymer, or benzoxazine, a combination of the foregoing, or another suitable adhesive. The structure may comprise an aircraft, rotorcraft, automobile, truck, item of equipment, or architectural structure. Optionally, the multi-layer adhesive may further comprise one or more tie coat layers to tie together two chemically incompatible adhesive layers or to tie together a substrate where the adhesive layer is chemically incompatible with the substrate.

In another embodiment of the disclosure, there is provided a multi-layer adhesive for reducing squeeze out. The multi-layer adhesive comprises a first adhesive layer having a first adhesive or chemical property, and the first adhesive layer is bonded to a composite substrate. The first adhesive or chemical property may comprise flow rate, wetability, strength, gap filling, material compatibility, temperature versus viscosity, ease of application, or another suitable adhesive or chemical property. Preferably, the first adhesive layer comprises an epoxy or another adhesive suitable for bonding to a composite substrate. The multi-layer adhesive further comprises a second adhesive layer having a second adhesive property. The second adhesive or chemical property may comprise flow rate, wetability, strength, gap filling, material compatibility, temperature versus viscosity, ease of application, or another suitable adhesive or chemical property. In this embodiment, the second adhesive property is different from the first adhesive property, and the second adhesive layer is bonded to a metal substrate. Preferably, the second adhesive layer comprises an epoxy or another adhesive suitable for bonding to a metal substrate. The first adhesive layer and the second adhesive layer form a film adhesive. The multi-layer film adhesive may be preferably positioned between the composite substrate and the metal substrate in order to bond the composite substrate to the metal substrate. The first adhesive layer preferably has a typical thickness of at least about 0.0015 inch. The second adhesive layer preferably has a typical thickness of at least about 0.0015 inch. The multi-layer adhesive may further comprise one or more additional adhesive layers. Optionally, the multi-layer adhesive may further comprise one or more tie coat layers to tie together two chemically incompatible adhesive layers or to tie together a substrate and an adhesive layer where the adhesive layer is chemically incompatible with the substrate.

The multi-layer film adhesive of the disclosed embodiments reduces squeeze out and provides for a non-homogeneous multi-layered adhesive combined into a single film with each layer optimized for adhesive or chemical performance properties. The multi-layer film adhesive of the disclosed embodiments is capable of improved effectiveness in bonding materials, particularly composites, by using chemically compatible films to form a multi-layer film adhesive. The multi-layer film adhesive also allows for bonding of hybrid joints and closed assemblies where access for removing squeeze out is not possible. The multi-layer film adhesive provides a single adhesive film comprised of multiple layers of adhesives having different adhesive or chemical properties, such as flow rate, wetability, strength, gap filling, material compatibility, temperature versus viscosity, ease of application, or another suitable adhesive or chemical property, thereby providing multiple functions in one adhesive film. It is possible to optimize the adhesive layers to the desired adhesive or chemical properties. Preferably, each adhesive layer may be optimized for one or two properties. However, each adhesive layer may also be optimized for more than two properties. Each adhesive layer may have different adhesive or chemical properties that will result in a better bonded joint. For example, the multi-layer film adhesive may have a first layer with an adhesive or chemical property optimized for good wetability and may have a second layer with an adhesive or chemical property optimized for toughness or strength. Alternatively, the first layer may have a very high flow rate and the second layer may have a controlled flow rate. The multi-layer film adhesive of the disclosed embodiments may also be used with pre-cured and/or uncured composite and/or metal parts.

The multi-layer film adhesive has at least two layers where each layer has a different adhesive or chemical property. However, the multi-layer film adhesive may have more than two layers and may have three, four, five, or more suitable adhesive layers. With a multi-layer film adhesive that has more than two layers, each adhesive layer may have different adhesive or chemical properties or one or more adhesive layers may have the same adhesive or chemical properties as long as at least one layer of the multi-layer adhesive has a different property than at least one other layer. The techniques that can be utilized to make the multi-layer film adhesives of the disclosure are well known in the art. For example, the multi-layer film adhesives of the disclosure may be produced via extrusion processes, coextrusion processes, casting, calendaring, filming, or another suitable process. The multi-layer film adhesive may be made in 3 inch, 6 inch, 12 inch, or other suitably sized rolls. The application of the multi-layer film adhesive to composite or metal parts may be applied manually or via automation. If automated, a conventional multi-ply tape laying machine or other suitable automated machine may be used to apply the adhesive to the composite or metal part.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A structure consisting of a first component part and a second component part bonded together with a multi-layer film adhesive to form a bonded joint of a bonded structural part of an aircraft, and for reducing squeeze out, the multi-layer film adhesive consisting of:
    a first adhesive layer having a top side and a bottom side, the bottom side designed to be applied directly to a first surface of a first substrate comprising the first component part of the bonded joint of the bonded structural part, the first adhesive layer further having a first adhesive property selected from the group consisting of flow rate, wetability, strength, gap filling, material compatibility, temperature versus viscosity, and ease of application; and,
    a second adhesive layer having a top side and a bottom side, the top side of the second adhesive layer designed to be applied directly to a second surface of a second substrate comprising the second component part of the bonded joint of the bonded structural part, the second adhesive layer further having a second adhesive property selected from the group consisting of flow rate, wetability, strength, gap filling, material compatibility, temperature versus viscosity, and ease of application, wherein the second adhesive property is different from the first adhesive property, and wherein the second substrate comprising the second component part is made of the same materials as the first substrate comprising the first component part;
    wherein the multi-layer film adhesive bonds the first component part of the bonded joint of the bonded structural part to the second component part of the bonded joint of the bonded structural part, and further wherein the multi-layer film adhesive is made of a material selected from the group consisting of an epoxy, a bismalimide, crosslinkable polymeric materials selected from the group consisting of methacrylate, polyimide, acrylic, polyurethane, epoxide polymer and benzoxazine, and a combination of the foregoing, and wherein the first component part and the second component part are both part of the bonded structural part of the aircraft, the bonded structural part consisting of one of, a wing skin bonded to a spar chord, a vertical stabilizer skin bonded to a stiffener, a horizontal stabilizer skin bonded to a stiffener, and a fuselage skin bonded to one of, shear tied frames, a leading edge slat, a fixed leading edge, fixed trailing edge panels, strut doors, engine cowls, trailing edge of control surfaces, and door surround doublers.

2. The structure of claim 1 wherein the first adhesive property is strength and the second adhesive property is gap filling.

3. The structure of claim 1 wherein the first adhesive property is flow rate and the second adhesive property is wetability.

4. The structure of claim 1 wherein the first component part is comprised of a material selected from the group consisting of composites and metals.

5. The structure of claim 1 wherein the second component part is comprised of a material selected from the group consisting of composites and metals.

6. The structure of claim 1 wherein the multi-layer film adhesive allows for bonding of hybrid joints of the bonded structural part and closed assemblies of the bonded structural part where access for removing the squeeze out is not possible.

7. The structure of claim 1 wherein the multi-layer film adhesive allows for bonding of hybrid component part assemblies of the structure and closed component part assemblies of the structure.

8. The structure of claim 1 wherein the first adhesive layer has a thickness of at least 0.0015 inch, and the second adhesive layer has a thickness of at least 0.0015 inch.

9. A structure consisting of a first component part and a second component part bonded together with a multi-layer film adhesive to form a bonded structural part, the bonded structural part being part of an aircraft and consisting of one of, a wing skin bonded to a spar chord, a vertical stabilizer skin bonded to a stiffener, a horizontal stabilizer skin bonded to a stiffener, and a fuselage skin bonded to one of, shear tied frames, a leading edge slat, a fixed leading edge, fixed trailing edge panels, strut doors, engine cowls, trailing edge of control surfaces, and door surround doublers, wherein the multi-layer film adhesive consists of a first adhesive layer having a top side and a bottom side, the bottom side designed to be applied directly to a first surface of the first component part of the bonded structural part, the first adhesive layer further having a first adhesive property, and wherein the multi-layer film adhesive consists of a second adhesive layer having a top side and a bottom side, the top side of the second adhesive layer designed to be applied directly to a second surface of the second component part of the bonded structural part, the second adhesive layer further having a second adhesive property, wherein the second adhesive property is different from the first adhesive property, and wherein the second component part of the bonded structural part is made of the same materials as the first component part of the bonded structural part, and further wherein the first adhesive layer and the second adhesive layer form a multi-layer film adhesive that combines chemically compatible films for improved bonding effectiveness and structural performance, and further wherein the multi-layer film adhesive is made of a material selected from the group consisting of an epoxy, a bismalimide, crosslinkable polymeric materials selected from the group consisting of methacrylate, polyimide, acrylic, polyurethane, epoxide polymer and benzoxazine, and a combination of the foregoing.

10. The structure of claim 9 wherein the first adhesive property and the second adhesive property are each selected from the group consisting of flow rate, wetability, strength, gap filling, material compatibility, temperature versus viscosity, and ease of application.

11. The structure of claim 9 wherein the first component part and the second component part are each selected from the group consisting of a composite, a metal, a pre-cured material, and an un-cured material.

12. The structure of claim 9 wherein the multi-layer film adhesive reduces squeeze out.

13. The structure of claim 9 wherein the multi-layer film adhesive allows for bonding of hybrid component part assemblies of the structure and closed component part assemblies of the structure.

14. The structure of claim 9 wherein the multi-layer film adhesive allows for bonding of hybrid joints of the bonded structural part and closed assemblies of the bonded structural part where access for removing the squeeze out is not possible.

15. A structure having a component part assembly consisting of a first component part and a second component part bonded together with a multi-layer film adhesive to form a bonded structural part of an aircraft, the multi-layer film adhesive consisting of:

a first adhesive layer having a top side and a bottom side, the bottom side designed to be applied directly to a first surface of the first component part of the bonded structural part, the first adhesive layer further having a first adhesive property selected from the group consisting of flow rate, wetability, strength, gap filling, material compatibility, temperature versus viscosity, and ease of application; and, a second adhesive layer having a top side and a bottom side, the top side of the second adhesive layer designed to be applied directly to a second surface of the second component part of the bonded structural part, the second adhesive layer further having a second adhesive property selected from the group consisting of flow rate, wetability, strength, gap filling, material compatibility, temperature versus viscosity, and ease of application, wherein the second adhesive property is different from the first adhesive property, and wherein the second component part is made of the same composite or metal materials as the first component part, and further wherein the multi-layer film adhesive is made of a material selected from the group consisting of an epoxy, a bismalimide, crosslinkable polymeric materials selected from the group consisting of methacrylate, polyimide, acrylic, polyurethane, epoxide polymer and benzoxazine, and a combination of the foregoing, and further wherein the first component part and the second component part are both part of the bonded structural part of the aircraft, the bonded structural part consisting of one of, a wing skin bonded to a spar chord, a vertical stabilizer skin bonded to a stiffener, a horizontal stabilizer skin bonded to a stiffener, and a fuselage skin bonded to one of, shear tied frames, a leading edge slat, a fixed leading edge, fixed trailing edge panels, strut doors, engine cowls, trailing edge of control surfaces, and door surround doublers.

16. The structure of claim 15 wherein the first adhesive property of the multi-layer film adhesive is flow rate and the second adhesive property of the multi-layer film adhesive is wetability.

17. The structure of claim 15 wherein the first adhesive layer has a thickness of at least 0.0015 inch, and the second adhesive layer has a thickness of at least 0.0015 inch.

18. The structure of claim 15 wherein the first adhesive layer of the multi-layer film adhesive is epoxy.

19. The structure of claim 15 wherein the second adhesive layer of the multi-layer film adhesive is epoxy.

20. The structure of claim 15 wherein the multi-layer film adhesive allows for bonding of hybrid component part assemblies of the structure and closed component part assemblies of the structure.

21. The structure of claim 15 wherein the multi-layer film adhesive allows for bonding of hybrid joints of the bonded structural part and closed assemblies of the bonded structural part where access for removing squeeze out is not possible.

\* \* \* \* \*